United States Patent [19]
Swanson

[11] Patent Number: 5,299,592
[45] Date of Patent: Apr. 5, 1994

[54] HIGH PRESSURE RELIEF SYSTEM

[75] Inventor: Wesley S. Swanson, Elk Grove Village, Ill.

[73] Assignee: Eaton Corporation, Cleveland, Ohio

[21] Appl. No.: 2,436

[22] Filed: Jan. 8, 1993

[51] Int. Cl.$^5$ ............... F16K 17/168; F16K 31/365; F16K 31/40
[52] U.S. Cl. ........................ 137/59; 137/879; 137/881; 251/30.03; 251/129.15
[58] Field of Search ............. 137/59, 879, 881; 251/30.03, 30.04, 129.15

[56] References Cited

U.S. PATENT DOCUMENTS

| | | |
|---|---|---|
| 2,940,722 | 6/1960 | Vargo .................... 251/30.03 |
| 3,834,412 | 9/1974 | Fannin . |
| 3,844,310 | 10/1974 | Brindisi . |
| 4,182,356 | 1/1980 | Woodford .................... 137/59 |
| 4,844,112 | 7/1989 | Pick et al. .................... 251/30.03 |

FOREIGN PATENT DOCUMENTS 56-164287 12/1981 Japan ..................... 137/59
WO89/02557 3/2389 World Int. Prop. O. .

Primary Examiner—Gerald A. Michalsky
Attorney, Agent, or Firm—R. A. Johnston

[57] ABSTRACT

An electrically operated valve assembly having a plastic body with a solenoid coil attached for moving an armature valve member for effecting flow from the vale inlet to outlet. In one embodiment the armature is a pilot valve slidably movable in a guide over which the solenoid is received. A spring loaded check valve in the guide releases over pressure within the valving chamber. In another embodiment a spring loaded check valve in the body inlet passage releases over pressure to a bypass passage to the outlet. In a third embodiment a slug having a spring loaded poppet relief valve is welded over an opening in the inlet passage at generally right angles to the inlet fitting to provide direct relief of over pressure in the inlet.

4 Claims, 3 Drawing Sheets

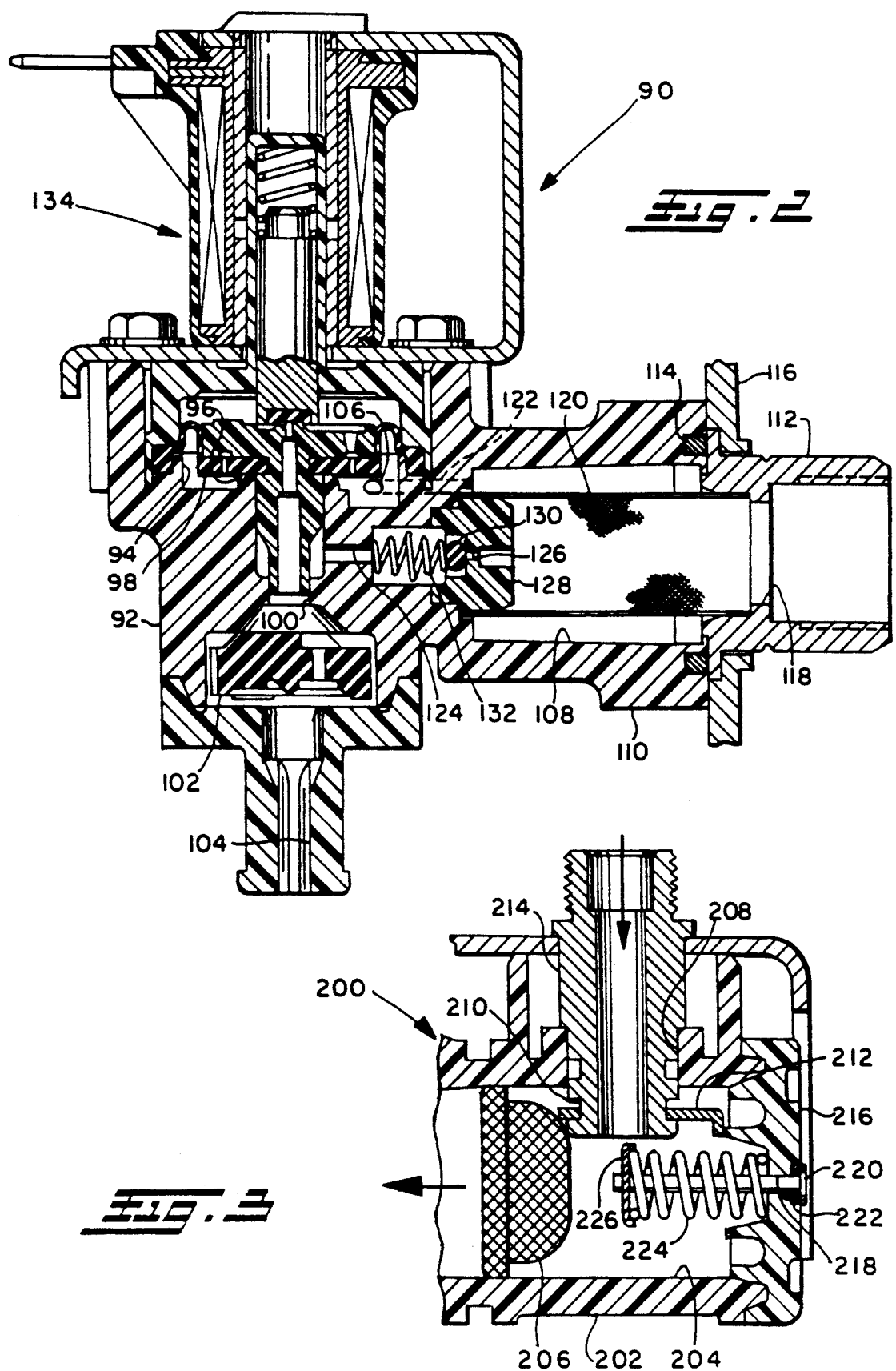

HIGH PRESSURE RELIEF SYSTEM

BACKGROUND OF THE INVENTION

The present invention relates to electrically operated valves such as solenoid operated valves employed for controlling water inlet to household appliances such as washing machines, dishwashers, and icemakers for refrigerators. Solenoid operated water inlet valves for household appliances typically utilize a plastic valve body and movable diaphragm type valving and are connected to a water supply by means of a compression type tube fitting in the case of small flow valves. Where relatively large flow is required, such as for washing machines, the valves typically of the pilot operated variety, and employ an electric coil disposed over a guide member with a movable armature therein for opening the pilot valve which creates a pressure differential across the diaphragm for effecting opening of the main valves. The water inlet valves of the aforesaid type may be connected directly to the household plumbing; and, the plumbing may be recessed in a wall of the building exposed to outside air temperatures. Where the plumbing is directed through an outside wall, problems are often encountered with freezing of the plumbing within the wall in regions insufficiently insulated to prevent sub-freezing temperatures from occurring in the plumbing during periods of non use. When ice forms in a localized region of the plumbing, the expansion caused during ice formation creates pressures in the plumbing which are substantially greater and often an order of magnitude greater than the normal pressures experienced in the water supply. These high pressures generated by ice formation in the household plumbing may cause bursting of the plastic bodied water inlet valve, which may be undetected at the time the burst occurs. Subsequently, upon the thawing of ice in the plumbing, flooding occurs through the appliance due to water flow through the burst in the inlet valve.

Thus it has been desired to provide a way or means of providing in a convenient, low-cost manner, high pressure relief for plastic bodied, electrically operated appliance water inlet valves to prevent rupture of the valves upon experiencing extraordinarily high pressures at the inlet such as the pressure experienced on the occasion of freezing in the plumbing structure to which the valve is connected for household use.

SUMMARY OF THE INVENTION

The present invention provides an electrically operated valve having means for relieving extremely high pressures at the inlet of the order capable of causing bursting of the valve body and particularly, pressures of the order encountered when freezing and ice formation occurs in the plumbing or water supply line to which the valve has been connected.

In one embodiment, the invention provides a spring biased check valve in the end of the guide tube to which the armature pilot valve is slidably received in a solenoid actuated pilot operated valve. In another embodiment, the valve has a bypass channel from the inlet to the outlet in which a check valve is provided to provide pressure relief directly to the valve outlet.

In another embodiment, the inlet passage has a generally right angled configuration, and is closed by a cover secured by non-metallic weldment, and which has a high pressure relief valve therein to discharge to the exterior of the valve body in the event of pressures being applied to the valve from the supply to which it is connected. The present invention thus incorporates a pressure relief valve integrally with the assembly of an electrically operated valve so as to provide pressure relief when the valve is subjected to inordinately high pressures, such as those encountered when localized freezing occurs in the plumbing or supply line to which the valve is connected.

BRIEF DESCRIPTION OF THE DRAWINGS

FIG. 2 is a view similar to FIG. 1, of another embodiment incorporating the pressure relief valve means in the inlet with a bypass passage connecting the pressure relief valve to the main valve outlet;

FIG. 3 is a portion of a sectional view of another embodiment having a right angle inlet passage, with a pressure relief valve integrally therewith for pressure relief to the exterior of the valve body; and, FIG. 4 is a portion of a section view of an alternate version of the embodiment of FIG. 3.

DETAILED DESCRIPTION

Figure 1:
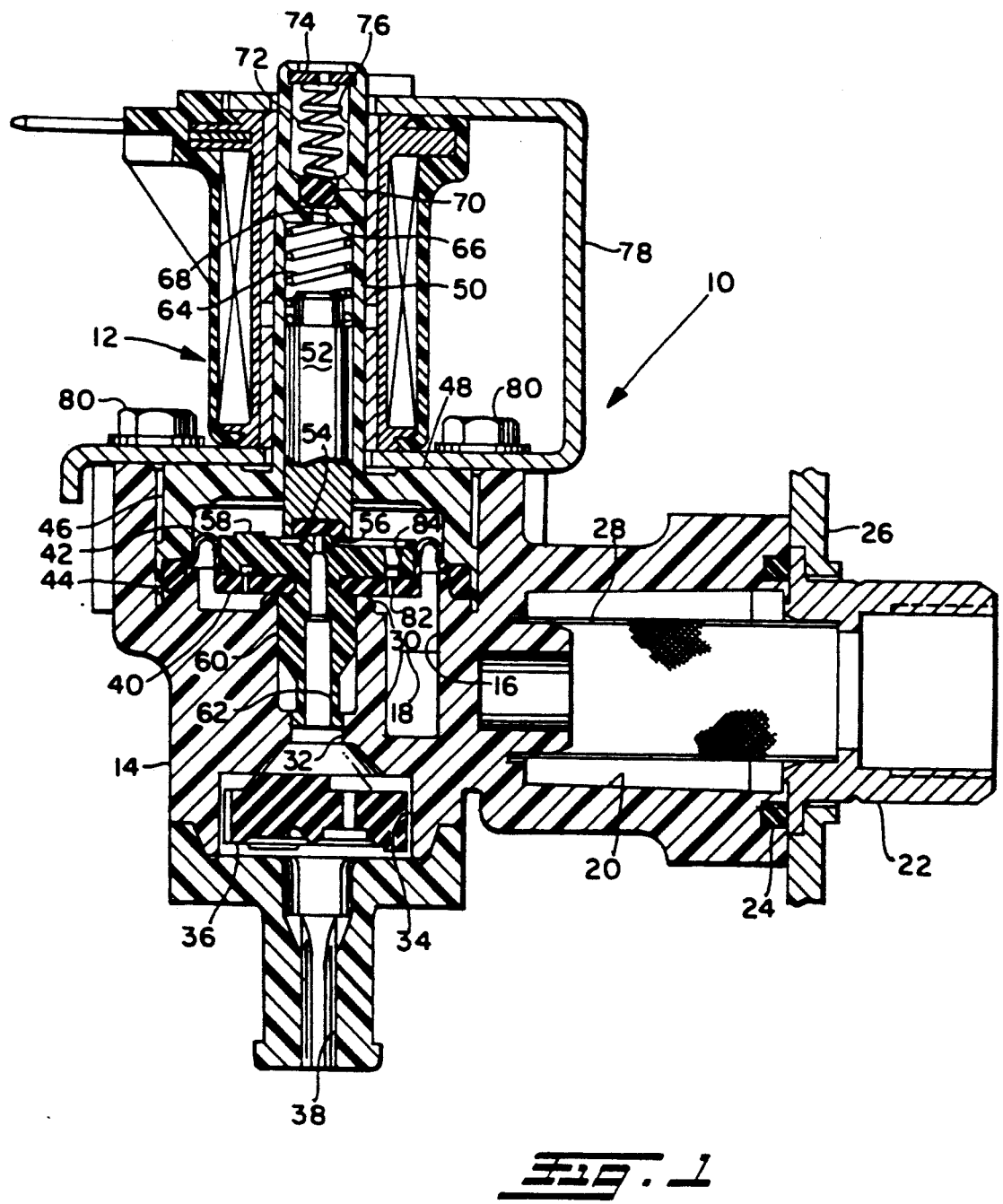
FIG. 1 is a cross-section of an embodiment of the valve incorporating the pressure relief valve in the armature guide of a pilot operated valve.

Referring to FIG. 1, an electrically operated valve assembly is indicated generally at 10, and is illustrated as actuated by a solenoid indicated generally at 12; and the valve is a pilot operated valve. The valve assembly 10 has a plastic body 14 which defines a valving chamber 16 having an inlet passage 18, which communicates with a larger inlet passage 20, which has an inlet fitting 22, typically of metal, attached thereto by a retaining member 26 and sealed thereabout by a seal ring 24. A suitable inlet filter screen 28 is provided in passage 20 for preventing foreign particles from entry through passage 18 through the valving chamber.

A main valve seat 30 is formed in the main valve chamber about outlet passage 32, which has an enlarged diameter section 34, in which is received a resilient flow control washer 36 which discharges to outlet passage 38.

A main valve member comprising a central thickened portion 40 contacts the valve seat 30; and, the valve member 40 is an integral part of the elastomeric diaphragm 42, which has an annular bead 44 formed about the outer periphery thereof. Bead 44 is sealed about the valving chamber 16 by an enlarged diameter portion 46 of a guide member 48, which has a reduced diameter upper portion 50. A ferromagnetic armature 52, which has an elastomeric pilot valve at 54 attached to the lower end thereof is slidably received in the reduced diameter portion 50. Pilot valve pad 54 contacts a pilot valve seat 56 formed on a rigid diaphragm insert 58, which has a depending portion 60 which extends through the valve member 40 and into the outlet passage. Insert 58 has a pilot flow passage 62 formed therethrough and which communicates with the outlet passage 32.

Armature 52 is biased downward by a spring 64 which has it supper end registered against transverse wall portion 66 closing the upper end of armature guide 50. The wall 66 comprising the closed upper end of the portion 50 of the guide member 48 has a small pressure relief orifice 68 formed therein as shown in FIG. 1 and which has seated on the upper end thereof a check-ball 70 which may be formed of elastomeric material and which seals the passage 68 under normal pressures experienced by the valve, but is lifted from the seat by extremely high pressures. The check-ball 70 is biased downwardly by a spring 72 which has its upper end registered against a washer 74 retained in the upper end of the armature guide 50 by deformation thereover of the material of the end. In the presently preferred practice, the transverse wall 66 and the cavity 76 are formed integrally with the armature guide 50. It will be understood that the solenoid coil 12 is received over the armature guide 50. The solenoid 12 is retained on the armature by a pole frame 78 attached to the body by screws 80. It will be understood to those having knowledge of the operation of a pilot operated valve that the valve member 40 has at least one bleed hole 80 formed therein, which bleed hole communicates with a corresponding bleed hole 82 formed in the diaphragm insert 58, and which permits fluid from the valving chamber to communicate with the region above the diaphragm and thereby permits pressure equalization across the diaphragm when the valve member 40 is seated on the main valve seat 30. It will also be understood that the diameter of the pilot passage 62 in the region of the pilot valve seat 56 must be greater than the diameter of the larger of bleed holes 82, 80 in order that the fluid may discharge from the portion of the chamber above the diaphragm at a greater rate than fluid enters through the hole 82 in order to create pressure differential upon opening of the pilot valve 54 to cause the differential pressure forces to lift the main valve member 40 from its seat, thereby opening the main valve in a manner well known in the art.

The embodiment of FIG. 1 thus provides pressure relief through the valve guide by opening of the check-ball 70 located in the distal or remote end of armature guide of a pilot-operated electromagnetically activated valve in the event of a very high pressure being applied to the valve inlet through the inlet fitting 22 as is the situation when localized freezing occurs in the supply line connected to the valve inlet fitting 22.

Referring to FIG. 2, another embodiment of the invention is indicated generally at 90, and has a plastic valve body 92 which has a valving chamber 94 formed therein with a main valve seat 96, similarly disposed to that of the FIG. 1 embodiment, with a movable main valve member 98 disposed thereagainst for controlling flow to an outlet passage 100 which communicates with a resilient flow control washer 102 and outlet passage 104. It will be understood that valve 90 is actuated by an electromagnetic actuator indicated generally by 134 in a manner similar to the embodiment of FIG. 1. An inlet port 106 is formed in the valving chamber, and communicates with inlet passage 108 formed in a side-projecting portion 110 of the body which has a metal inlet fitting 112 secured therein over seal ring 114 by a suitable bracket 116. Inlet fitting 112 has a passage 118 formed therein through which fluid from a supply (not shown) enters the interior of a cylindrical screen 120 which traps therein foreign particles larger than a predetermined size corresponding to the mesh size of the screen and through which fluid flows outwardly to passage 108 and through connecting passage 122, which supplies port 106. A bypass passage 124 is formed on the body which communicates with passage 118 in the interior of screen 120 via an orifice 126 formed in a retaining plug 128. Orifice 126 has a check-ball or valve member 130 seated against the interior end of orifice 126 and an enlarged diameter bore formed in the plug; and, the check valve is biased against the end of the orifice by a spring 132. The spring provides a biasing force sufficient to hold the check valve in the closed position against the end of orifice 126 until the pressure in the inlet reaches a predetermined substantially elevated level above the normal service pressures of the supply to which the valve is connected to cause the check-ball to unseat and permit flow through bypass channel 124 directly to the outlet 100.

Referring to FIG. 3, another embodiment of the invention is illustrated generally at 200 to which the valve body has an inlet section 202, which has an inlet passage 204 supplying the valve in the direction of the black arrow shown in FIG. 3 to a suitable filtering screen 206 which is typically pressed into the passage 204.

A metal inlet fitting 214 is received through an aperture 208 provided in the passage 204. The fitting has a peripheral groove 210 formed therein which groove is engaged by a bifurcated metal retaining bracket 212 which assembled onto the fitting 214 upon assembly of the fitting into the aperture 208; it being understood that the bracket is assembled through the open end of passage 204. Upon assembly of bracket 212 onto the fitting 214, a plastic cover 216 is secured over the open end of passage 204 by suitable non-metallic weldment such as, for example, spin welding or ultrasonic or vibration welding.

Referring to FIG. 3, the plastic plug 216 has a bore 218 therethrough which has received therein a poppet valve member 220, which has the head thereof seating against a seal ring 222, and which is biased thereagainst by a spring 224 having one end registered against the inner face of plug 216, the other end registering against a spring retainer 226 attached to the end of the poppet valve 220. The spring 224 exerts a sufficient force against the spring retainer 226 to maintain the poppet heads sealed against seal ring 222 until the pressure in the passage 204 reaches a predetermined level, generally an order of magnitude greater than the maximum service pressure to which the valve is to be subjected upon connection to a pressurized source.

Figure 4:
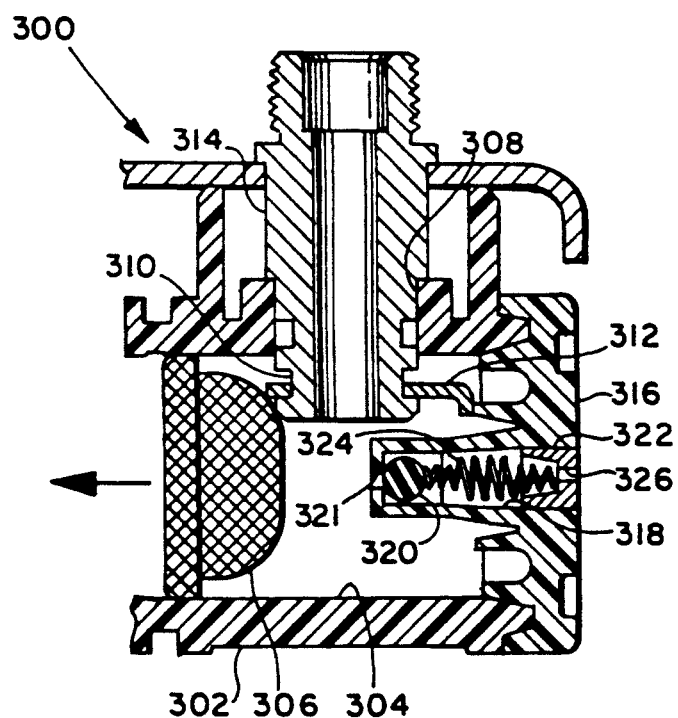

Referring to FIG. 4, another embodiment indicated generally at 300 provides an alternate version of the embodiment of FIG. 3, wherein the valve body 302 which is formed of plastic material, has an inlet passage 304 formed therein and open to the right-hand side of the body; and, has a suitable filter screen 306 received therein for screening which is indicated by the black arrow pointing leftward in FIG. 4. Inlet fitting aperture or bore 308 is formed in the body at generally right angles to the passage 304; and, bore 308 has received therein a metal inlet fitting 314 which has a peripheral groove 310 formed about the end thereof which extends into the passage 304. The fitting 314 is retained in the bore 308 by a bifurcated metal clip 312 which has the bifurcated portion thereof received in the groove 310.

The retaining clip 312 is secured in place by registration against a plastic closure or plug member 316, which is secured over the end of passage 304 by suitable non-metallic weldment.

Plug 316 has a generally flat bottom bore or recess 318 formed therein, with an elastomeric check ball or valve member 320 received therein and seating against the end of a relief valving passage 321 formed in the flat bottom of bore 318; and, check valve 320 is biased against the seat by one end of a spring 324 which has its opposite end retained by a second small plug 322 secured in recess 318 by suitable non-metallic weldment.

The plug 322 has a relief passage 326 provided therein to permit discharge to the exterior of the body upon unseating of the valve member 320. It will be understood that the spring 324 has its deflection characteristics chosen to provide sufficient force against the valve 320 to prevent unseating until a sufficiently high pressure is experienced in the chamber or passage 304.

The embodiment of FIG. 4 thus provides for the check valve to be completely covered and interiorly disposed as contrasted to the arrangement of FIG. 3.

The present invention thus provides a unique and novel over-pressure relief for a electrically operated plastic bodied valve which prevents rupture of the valve body upon the water supply, to which the valve is connected, experiencing abnormally high pressures, which would otherwise burst the valve body.

Although the invention has hereinabove been described with respect to the illustrated embodiments, it will be understood that the invention is limited only by the following claims.

I claim:

1. An electrically operated valve assembly comprising:
   (a) body means including means defining a valving chamber with an inlet and an outlet, and valve means movable therein for between a position blocking and a position permitting flow between said inlet and outlet upon connection of said inlet to a source of fluid under pressure;
   (b) said means defining a valving chamber including a hollow guide member with an armature movably disposed in said hollow guide member and operable to effect said movement of said valve means upon magnetomotive energization;
   (c) pressure relief valve means provided in said hollow guide member and located distal said above means and operable to discharge fluid therefrom at pressures in excess of a predetermined level or value substantially greater than the normal pressures of said supply and,
   (d) electromagnetically operated means for effecting movement of said valve means.

2. The valve assembly defined in claim 1, wherein said relief valve means is disposed in said hollow guide member remote from said armature.

3. The valve assembly defined in claim 1, wherein said hollow guide member includes a closed end tube with a relief port formed in the end thereof and said relief valve means includes a check valve member seating against said port on the side thereof remote from said armature.

4. The valve assembly defined in claim 1, wherein said body means is formed of plastic material.

* * * * *